(12) United States Patent
Mattschas et al.

(10) Patent No.: US 10,208,616 B2
(45) Date of Patent: Feb. 19, 2019

(54) TURBOMACHINE WITH BLADES HAVING BLADE TIPS LOWERING TOWARDS THE TRAILING EDGE

(71) Applicant: MTU Aero Engines AG, Munich (DE)

(72) Inventors: Axel Mattschas, Starnberg (DE); Helmut Eibl, Furstenfeldbruck (DE); Sergio Elorza Gomez, Munich (DE); Dirk Henrichs, Munich (DE)

(73) Assignee: MTU AERO ENGINES AG, Munich (DE)

( * ) Notice: Subject to any disclaimer, the term of this patent is extended or adjusted under 35 U.S.C. 154(b) by 150 days.

(21) Appl. No.: 14/751,404

(22) Filed: Jun. 26, 2015

(65) Prior Publication Data
US 2015/0377053 A1 Dec. 31, 2015

(30) Foreign Application Priority Data
Jun. 30, 2014 (DE) .................. 10 2014 212 652

(51) Int. Cl.
| | | |
|---|---|---|
| *F01D 11/12* | (2006.01) | |
| *F01D 5/02* | (2006.01) | |
| *F01D 9/04* | (2006.01) | |
| *F01D 5/14* | (2006.01) | |
| *F01D 5/20* | (2006.01) | |

(52) U.S. Cl.
CPC .............. *F01D 11/122* (2013.01); *F01D 5/02* (2013.01); *F01D 5/141* (2013.01); *F01D 5/20* (2013.01); *F01D 9/04* (2013.01); *F01D 11/12* (2013.01); *F05D 2240/307* (2013.01); *Y02T 50/673* (2013.01)

(58) Field of Classification Search
CPC ......................................................... F01D 5/20
See application file for complete search history.

(56) References Cited

U.S. PATENT DOCUMENTS

| | | | | |
|---|---|---|---|---|
| 1,568,034 A | * | 12/1925 | Losel ...................... | F01D 11/08 415/173.6 |
| 4,645,417 A | * | 2/1987 | Wisler .................... | F01D 11/08 415/173.1 |
| 4,738,586 A | | 4/1988 | Harter | |

(Continued)

FOREIGN PATENT DOCUMENTS

| | | |
|---|---|---|
| DE | 10244038 A1 | 4/2004 |
| DE | 102009040298 A1 | 3/2011 |

(Continued)

*Primary Examiner* — Logan M Kraft
*Assistant Examiner* — John S Hunter, Jr.
(74) *Attorney, Agent, or Firm* — Barlow, Josephs & Holmes, Ltd.

(57) ABSTRACT

A turbomachine, particularly an aircraft engine, having a rotor, which is mounted rotatably around its longitudinal axis in a stator, and which has at least one row of rotating blades, which is formed by a plurality of rotating blades, is disclosed, wherein the stator has at least one abradable layer, and wherein each rotating blade has a blade tip that is lowered radially inward, at least in sections, proceeding from a leading edge on the side of the rotating blades in the direction of a trailing edge on the side of the rotating blades, and with a blade tip region that extends downstream from the leading edge runs into the abradable layer during operation of the turbomachine.

5 Claims, 5 Drawing Sheets

(56) References Cited

U.S. PATENT DOCUMENTS

| | | | | |
|---|---|---|---|---|
| 5,275,531 | A | * | 1/1994 | Roberts .................. F01D 5/143 |
| | | | | 415/173.1 |
| 5,756,217 | A | * | 5/1998 | Schroder .................. F01D 5/20 |
| | | | | 428/148 |
| 7,811,053 | B2 | * | 10/2010 | Balamucki ................ F01D 5/10 |
| | | | | 415/173.1 |
| 8,657,570 | B2 | * | 2/2014 | Kray ........................ F01D 5/20 |
| | | | | 415/173.4 |
| 9,803,495 | B2 | * | 10/2017 | Scothern ............... F01D 11/122 |
| 9,932,839 | B2 | * | 4/2018 | Guo ......................... F01D 5/20 |
| 2007/0020101 | A1 | | 1/2007 | Balamucki et al. |
| 2007/0077149 | A1 | * | 4/2007 | Lejars ....................... F01D 5/20 |
| | | | | 416/223 R |
| 2007/0248457 | A1 | | 10/2007 | Dodd et al. |
| 2013/0078084 | A1 | | 3/2013 | Gendrich et al. |

FOREIGN PATENT DOCUMENTS

| | | |
|---|---|---|
| EP | 1529962 A2 | 5/2005 |
| EP | 2071137 A2 | 6/2009 |
| EP | 2412927 A1 | 2/2012 |
| EP | 2444592 A1 | 4/2012 |
| EP | 2578805 A1 | 4/2013 |
| WO | 2010007137 A1 | 1/2010 |
| WO | 2011002570 A1 | 1/2011 |
| WO | 2011157927 A1 | 12/2011 |
| WO | 2012110865 A1 | 8/2012 |
| WO | 2012163337 A1 | 12/2012 |

* cited by examiner

TURBOMACHINE WITH BLADES HAVING BLADE TIPS LOWERING TOWARDS THE TRAILING EDGE

BACKGROUND OF THE INVENTION

A conventional blade tip geometry of a blade part 1 of a rotating blade of a turbomachine, such as a gas turbine, for example, an aircraft engine, is shown in FIG. 1. The blade part 1 has a blade tip 2, which extends in the direction of a primary flow of a leading edge 4 to a trailing edge 6 of the blade part 1 and runs into an abradable layer 10 on the stator side during operation. The abradable layer 10 here is an abradable silicone layer, the layer loss thereof being determined by mechanical action during the rubbing against the blade tip 2. During the rubbing, the blade tip 2 pushes a "pile of silicone" in front of it until the tensile strength of the silicone material is reached and the silicone material breaks apart. The silicone particles that have been released increase still further the breaking apart of the layer beyond the actual degree of rubbing. A parasitic gap loss 12 is established thereby, which leads to an unwanted enlargement of an operating gap and thus to loss of efficiency and pump limit losses. In order to improve the running-in behavior, it is known to introduce peripheral grooves in the abradable layer. The introduction of peripheral grooves, however, complicates manufacturing techniques.

It is known from WO 2011/002570 A1 to provide blade tips of rotating blades with a cutting edge on the side of the leading edge and additionally to permit the blade tip to slope radially inward in the direction of the trailing edge. In operation, the cutting edge is positioned toward a rubber-like abradable layer on the stator side in such a way that an operating gap is basically formed between the rotating blades and the abradable layer. Now, if the blade tip runs into the abradable layer for a short time, then a defined abrasion of the abradable layer should result by means of the cutting edge. In this way, a reduction in the load on the blade should be achieved predominantly, since the layer particles abraded by the cutting edge should not remain adhered to the blade tip. Additional prior art is known from WO 2011/157927 A1, WO 2012/163337 A1, EP 1 529 962 A2, US 2007/020101 A1, EP 2 444 592 A1 and from EP 2 412 927 A1.

SUMMARY OF THE INVENTION

The object of the invention is to create a turbomachine that makes possible an improved rubbing-in behavior of the rotating blades thereof each time into an abradable layer lying opposite on the stator side.

This object is achieved by a turbomachine with the features of the present invention.

A turbomachine according to the invention, particularly an aircraft engine, has a rotor, which is mounted rotatably around its longitudinal axis in a stator, and which has at least one row of rotating blades, which is formed by a plurality of rotating blades. The stator has at least one abradable layer. According to the invention, the rotating blades have blade tips that are lowered radially inward, at least in sections, proceeding from leading edges on the side of the rotating blades in the direction of trailing edges on the side of the rotating blades, In this way, the rotating blades, via a front or leading region of the blade tip, each run into the abradable layer during operation.

Due to the fact that the rotating blades have blade tips that are lowered radially inward, at least in sections, proceeding from leading edges on the side of the rotating blades in the direction of trailing edges on the side of the rotating blades, in combination with the running in of the leading blade tip regions, a smooth rubbing-in behavior is achieved on the side of the abradable layer, since the blade tips run into the abradable layer from the leading edges to the trailing edges in a decreasingly deep manner. A parasitic gap loss or an additional gap is prevented or almost completely reduced, and an operating gap is minimized. Consequently, the turbomachine according to the invention makes possible an improved efficiency and fewer pump limit losses when compared with known turbomachines, which were described above. Also, there is less polluting of a secondary air flow with particles from the layer. The breaking apart of the abradable layer is clearly reduced and thus an internal polluting of the turbomachine with layer particles is reduced. Also, the front or leading blade tip regions, which have the greatest aerodynamic influence, remain unchanged or nearly unchanged when compared to conventional rotating blades. Simultaneously, due to the fact that the blade tips have a sloping contour, the abradable layer can remain unchanged on the stator side. The fine tuning of the blade tips is basically more cost-effective than the adjustment of the abradable layer and can be integrally produced in the manufacture of the rotor blades. Also, the adjustment of the blade tips is devoid of wear. In particular, the abradable layer is rubber-based. Preferably, it is composed of silicone.

In one exemplary embodiment, the rotating blades each run into the abradable layer via a back or trailing blade tip region during operation. As a result, a very tight seal is achieved in the blade tip region, since the latter runs into the abradable layer over its entire extent from the respective leading edge to the respective trailing edge.

In another exemplary embodiment, the rotating blades are each distanced from the abradable layer during operation by a trailing region of the blade tip. In this way, material rubbed off from the abradable layer is transported away somewhat downstream due to the lowering of the blade tips. An enlargement of an abradable layer "pile" due to the abraded material is reliably prevented by this transport.

In order to reliably prevent a transport of the abraded particles into a secondary flow, it is advantageous if the trailing blade tip regions terminate radially inward of a stator-side side wall structure, which delimits the primary flow radially outward. In this way, the free particles are reliably introduced into the primary flow.

In one exemplary embodiment, the blade tips have a plurality of adjacent linear regions with different angular positions relative to one another. Such blade tips can be simply produced by manufacturing techniques by means of the linear formation of individual blade tip regions. In an alternative exemplary embodiment, the blade tips have a plurality of arc-shaped regions with different radii. Preferred angle/blade depth ratios are in the range of [0.005:0.015]. The angle/blade depth ratios result, for example, by means of a 0.2 mm to 0.3 mm lowering of the trailing blade tip region relative to the leading blade tip region referred to a blade depth of 20 mm to 40 mm.

In another alternative exemplary embodiment, the blade tips each have at least one linear region and one arc-shaped region. In all of the embodiment examples, the blade tips each have at least two regions with different geometric contours. The more regions the blade tips have, the more precisely they can be adjusted aerodynamically.

The abradable layer preferably seals flush with the side wall structure. Due to the circumstance that, considered in the direction of primary flow, the side wall structure transitions flush into the abradable layer, and the layer in turn transitions flush into the side wall structure, turbulence that is close to the side walls in the upstream transition region and in the downstream transition region between the side wall structure and the abradable layer is prevented.

Other advantageous embodiment examples of the invention are discussed in detail below.

BRIEF DESCRIPTION OF THE DRAWING FIGURES

Preferred examples of embodiment of the invention will be explained in more detail in the following on the basis of very simplified schematic representations. Herein:

DESCRIPTION OF THE INVENTION

Figure 2:
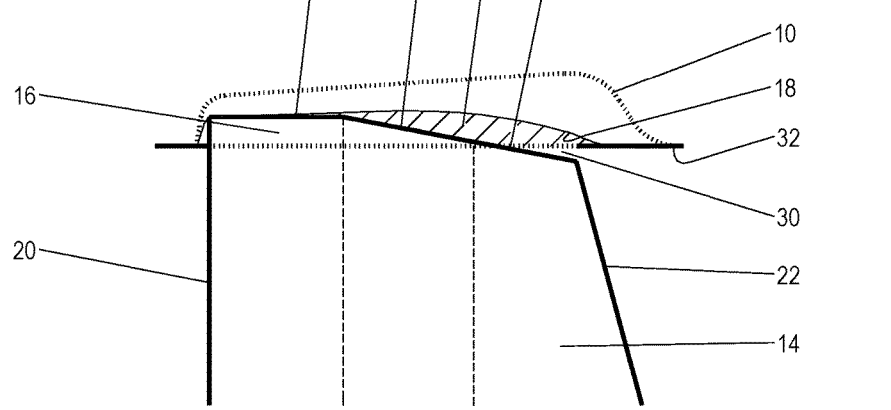
FIG. 2 shows a rotating blade with a blade tip region that runs into an abradable layer on the stator side of a turbomachine according to a first exemplary embodiment according to the invention.

A blade part 14 of a rotating blade in the region of its blade tip 16 of a turbomachine according to the invention is shown in side view in FIG. 2. Along with other rotating blades, the rotating blade forms a row of rotating blades of a rotor, e.g. the blade of FIG. 2 is shown, of the turbomachine, which rotates around its longitudinal axis in the stator 42 of the turbomachine. An operating state or the operation of the turbomachine, in which the rotating blades run in sections into an abradable layer 18 on the stator side via their blade tips 16, is shown in FIG. 2.

A main flow or primary flow passes through the turbomachine basically in the longitudinal direction of the rotor, and the rotating blades 44 are exposed to this flow. The direction of flow of the primary flow runs from left to right in the exemplary embodiment shown here. In the meaning of the invention, indications such as "axial" and "radial" refer to the longitudinal axis of the rotor. In the meaning of the invention, indications such as "forward or upstream" and "back or downstream" refer to the flow direction of the primary flow.

The blade tip 16 has a leading blade tip region 24, a central blade tip region 26, and a trailing blade tip region 28. For the visual clarification of the blade tip regions 24, 26, 28, vertical dashed lines are depicted in the blade part 14. The blade tip regions 24, 26, 28 have the same or approximately the same axial dimension. Preferably, the leading blade tip region 24 has the longest axial dimension.

The leading blade tip region 24 is designed to be linear. Here, it runs without adjustment axially relative to the longitudinal axis of the rotor and thus in the longitudinal direction of the primary flow. The central blade tip region 26 is formed linearly just like the leading blade tip region 24. Of course, the central blade tip region 26 is positioned at an angle to the axis of rotation and thus to the leading blade tip region 24. The adjustment is such that the blade tip 16 slopes radially inward from its leading edge 20 to its trailing edge 22. The trailing blade tip region 28 is also designed linearly and positioned at an angle to the longitudinal axis of the rotor. It is positioned at the same angle as the central blade tip region 26. In this way, it connects to the central blade tip region 26 without any step and extends to the trailing edge 22.

During operation, which is shown in FIG. 2, the leading blade tip region 24 and the central blade tip region 26 run into the abradable layer 18, while, in contrast, in this exemplary embodiment, the trailing blade tip region 28 is radially distanced from the abradable layer 18 by means of a gap 30. The gap 30 is delimited radially outward from the abradable layer 18 and radially inward from the trailing blade tip region 28. It is expanded here downstream in wedge-shaped manner. The blade tip 16 thus runs into the abradable layer in sections, but not by its trailing blade tip region 28. The trailing edge 22 has an extension directed radially outward so that it terminates radially inward relative to a side wall structure 32 on the stator side, this side wall structure 32 delimiting radially outward an annular space through which runs the primary flow. As a result, the trailing blade tip region 28 terminates radially inward relative to the side wall structure 32. The gap 30 is thus open to the annular space and therefore to the primary flow.

The abradable layer 18 is inserted in a peripheral groove of a stator section and is sealed flush with the side wall structure 32 downstream and upstream of the peripheral groove. For example, it is adhesively bonded into the peripheral groove and is composed of a rubber-like material. Preferably, it is composed of silicone.

When the turbomachine is shut down, the rotating blades with their blade tips 16 are distanced from the opposite-lying abradable layer 18. Between the abradable layer 18 and the blade tips 16, there is a so-called cold gap.

Figure 1:
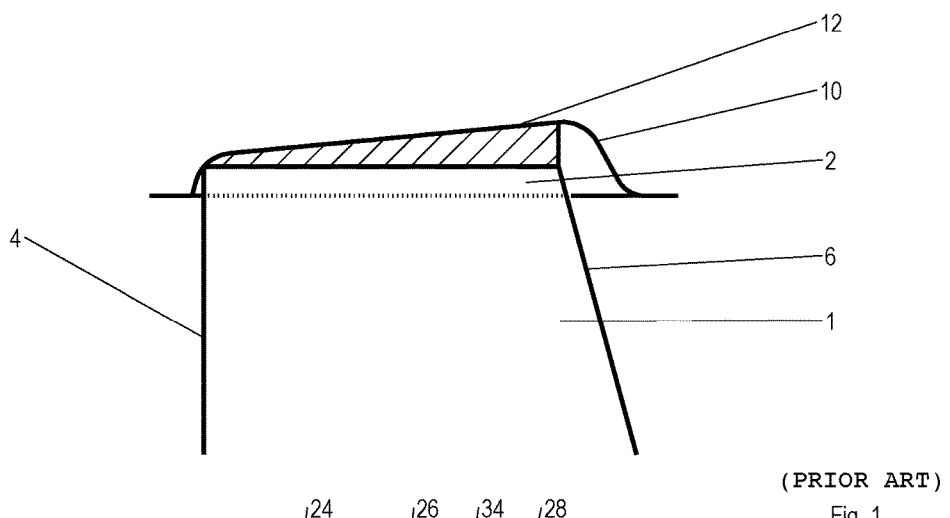
FIG. 1 shows a rotating blade with a conventional blade tip region that runs into an abradable layer on the stator side of a turbomachine.

During operation, the rotating blades continually run into the abradable layer 18 with their leading and, here also, central blade tip regions 24, 26, and push a "pile" of material in front of them. As soon as the tensile strength of the abradable layer material is exceeded, particles break away or break off from the abradable layer 18. As a result, an operating gap 34, which is shown by the hatching, is formed. The material or particles that have been released are transported downstream along the central and trailing blade tip regions 26, 28, and escape into the primary flow via the gap 30 acting as a downstream opening of the operating gap 34. Based on the contour of the blade tip 16 according to the invention and the removal of the free particles, a parasitic gap loss cannot form. The operating gap 34, which is established in this way and is indicated by hatching, is widened downstream. For comparison, the envelope curve of the abradable layer 10 of FIG. 1 is depicted in FIG. 2. During operation, it is nearly equal to zero or is not present in the region of the leading blade tip region 24.

Figure 3:
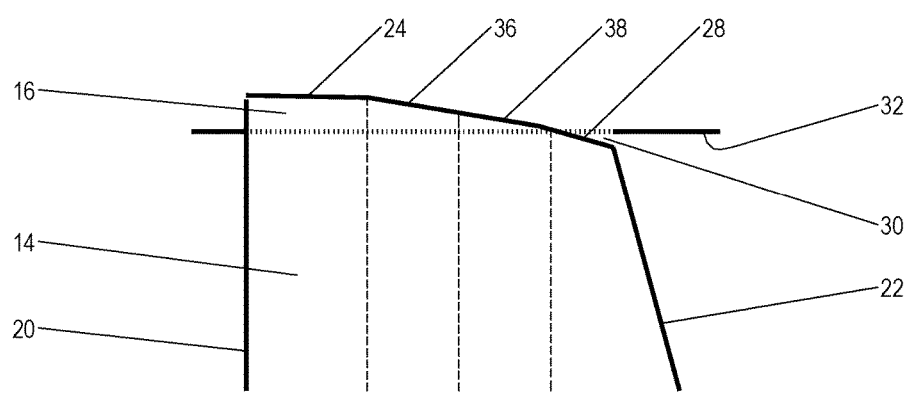
FIG. 3 shows a rotating blade with a blade tip region that runs into an abradable layer on the stator side of a turbomachine according to a second exemplary embodiment according to the invention.
Figure 4:
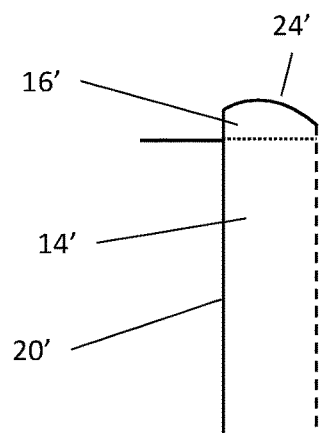
Figure 5:
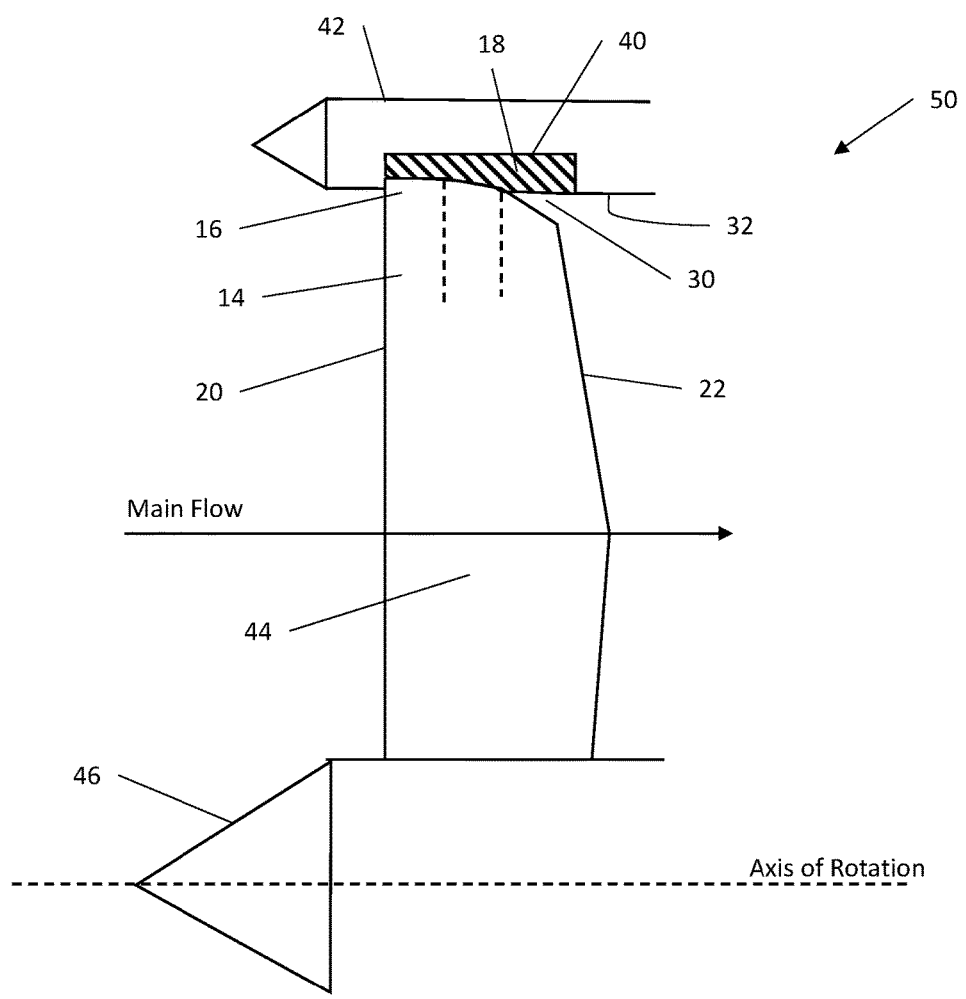
Figure 6:
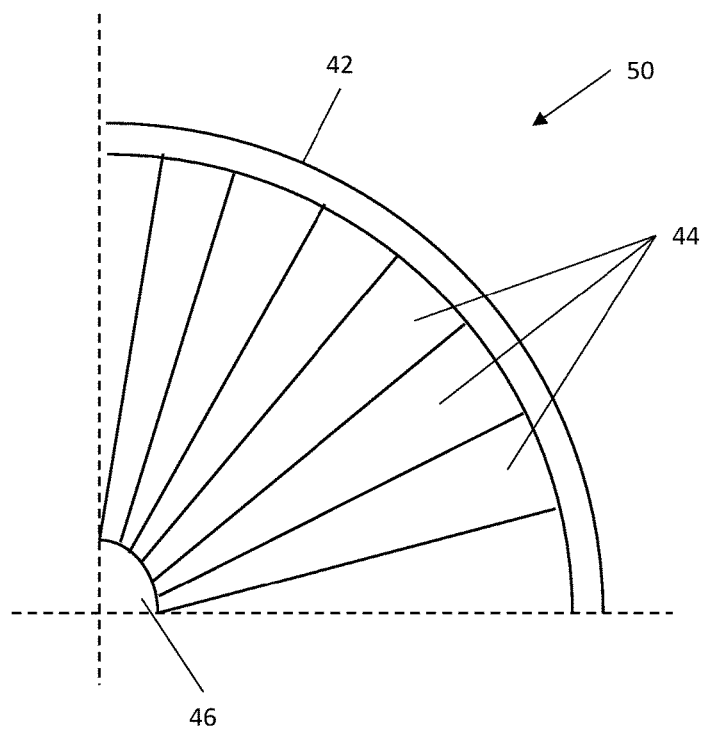
Figure 7:
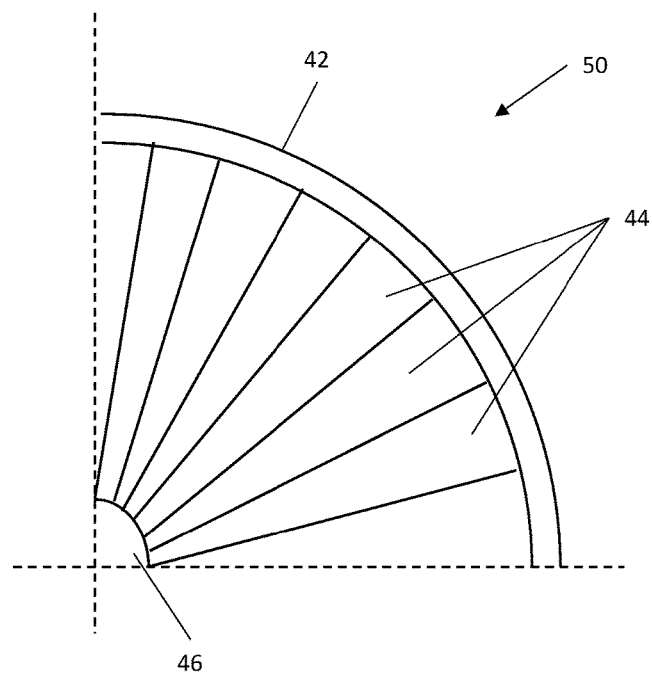

An alternative blade tip 16 of a blade part 14 of a rotating blade of a turbomachine according to the invention is shown in FIG. 3, in the operating state of the turbomachine. Unlike the first exemplary embodiment according to FIG. 2, the contour of the blade tip is shown as a traverse composed of 4 blade tip regions 24, 28, 36, 38. As a result, a more precise aerodynamic fine tuning of the blade tip 16 is provided than in the first exemplary embodiment according to FIG. 2.

All of the blade tip regions 24, 28, 36, 38 are linear and have the same or approximately the same axial dimension. Preferably, the leading blade tip region 24 has the longest axial dimension.

The leading blade tip region 24 is easily positioned in the longitudinal direction of a rotor. A first central blade tip region 36 connecting to the leading blade tip region 24 is guided radially inward and transitions into a second central blade tip region 38. The second central blade tip region 38 is found at an angular position relative to the first central blade tip region 36 and transitions into the trailing blade tip region 28, which terminates radial inward relative to the radially outer side wall structure 32 on the stator side. The trailing blade tip region 28 has the same angular position relative to the longitudinal axis of the rotor, so that it extends without a step from the trailing central blade tip segment 38. The blade tips 16 run into the abradable layer 18 via their leading blade tip regions 24 and central blade tip regions 36, 38. In this exemplary embodiment, however, they are radially distanced from the stator-side abradable layer 18, which is not shown, by their trailing blade tip region 28, and are also disposed here radially inward relative to the side wall structure 32, so that a wedge-shaped gap 30 open to the primary flow is likewise formed, by means of which particles of the abradable layer 18 that have broken off are removed in the primary flow.

The invention is shown in FIGS. 2 and 3 based on a division of the blade tips 16 into thirds or quarters. It is expressly stated that other types of divisions or perspectives of the blade tips 16 are also found within the scope of the invention. It is also possible to form the individual blade tip regions 24, 26, 28, 36, 38 with varying axial dimensions and/or in arc shape. For example, in a third exemplary embodiment, the blade tips have a plurality of arc-shaped regions with different radii. Preferred angle/blade depth ratios are in the range of [0.005:0.015]. The angle/blade depth ratios result, for example, by means of a 0.2 mm to 0.3 mm lowering of the trailing blade tip region relative to the leading blade tip region referred to a blade depth of 20 mm to 40 mm. Also, in fourth exemplary embodiment, the blade tips each have at least one linear region and one arc-shaped region. In all of the embodiment examples, the blade tips each have at least two regions with different geometric contours. The more regions the blade tips have, the more precisely they can be adjusted aerodynamically. It is also expressly stated that the invention also comprises embodiment examples, which are not shown in the figures, in which the blade tip region 28, which transitions downstream into the trailing edge 22, can also run into the abradable layer 18 during operation, so that the rotating blades then run into the abradable layer 18 during operation via all of the regions 24, 26, 28, 36, 38 of their blade tips 16, thus over their entire extent between the leading edge 20 and the trailing edge 22.

A turbomachine, particularly an aircraft engine, having a rotor, which is mounted rotatably around its longitudinal axis in a stator, and which has at least one row of rotating blades, which is formed by a plurality of rotating blades, is disclosed, wherein the stator has at least one abradable layer 18, and wherein each rotating blade has a blade tip 16 that is lowered radially inward, at least in sections, proceeding from a leading edge 20 on the side of the rotating blades in the direction of a trailing edge 22 on the side of the rotating blades, and via a blade tip region 16 that extends downstream from a leading edge 22 of the blade runs into the abradable layer 18 during operation of the turbomachine.

What is claimed is:

1. A turbomachine, comprising:
 a rotor, which is mounted rotatably around its longitudinal axis in a stator, and which has at least one row of rotating blades, which is formed by a plurality of rotating blades,
 the stator having at least one abradable layer,
 each rotating blade of the plurality of rotating blades having blade tips comprising a front blade tip region, at least one middle blade tip region, and a trailing blade tip region that are lowered radially inward in sections from a leading edge of the rotating blade to a trailing edge of the rotating blade,
 wherein, during operation, the front blade tip region and the at least one middle blade tip region of each of the rotating blades runs into, and is in contact with, the at least one abradable layer, and the trailing blade tip region is radially distanced from the at least one abradable layer, forming a radial gap, whereby formation of a parasitic gap is prevented,
 wherein the front blade tip region extends from the leading edge of the rotating blade to the at least one middle blade tip region in a direction towards the trailing edge of the rotating blade,
 wherein the trailing blade tip region extends from the at least one middle blade tip region to the trailing edge of the rotating blade, and
 wherein radial dimensions of the front blade region are greater than radial dimensions of the at least one middle blade tip region, and the radial dimensions of the at least one middle blade tip region are greater than radial dimensions of the trailing tip region.

2. The turbomachine according to claim 1, wherein the trailing blade tip region of each of rotating blades of the plurality of rotating blades terminate downstream radially inward relative to a side wall structure on the stator side.

3. The turbomachine according to claim 2, wherein the front blade tip region, the at least one middle blade tip region, and the trailing blade tip region of the blade tips comprise linearly adjacent regions with different angular positions relative to one another.

4. The turbomachine according to claim 2, wherein one of the front blade tip region, the at least one middle blade tip region, and the trailing blade tip region of the blade tips comprise an arc-shaped region.

5. The turbomachine according to claim 2, wherein the at least one abradable layer is inserted into a peripheral groove on the stator side and is sealed flush with the side wall structure.

* * * * *